United States Patent
Jarett

(10) Patent No.: US 11,176,205 B2
(45) Date of Patent: Nov. 16, 2021

(54) VISUAL DATA MODEL OBJECT DEPENDENCY TRACING

(71) Applicant: Google LLC, Mountain View, CA (US)

(72) Inventor: Leigha Jarett, New York, NY (US)

(73) Assignee: Google LLC, Mountain View, CA (US)

(*) Notice: Subject to any disclaimer, the term of this patent is extended or adjusted under 35 U.S.C. 154(b) by 221 days.

(21) Appl. No.: 16/443,827

(22) Filed: Jun. 17, 2019

(65) Prior Publication Data
US 2020/0394218 A1 Dec. 17, 2020

(51) Int. Cl.
| | |
|---|---|
| *G06F 16/00* | (2019.01) |
| *G06F 16/904* | (2019.01) |
| *G06F 17/15* | (2006.01) |
| *G06F 16/901* | (2019.01) |
| *G06F 16/22* | (2019.01) |

(52) U.S. Cl.
CPC ........ *G06F 16/904* (2019.01); *G06F 16/2282* (2019.01); *G06F 16/9024* (2019.01); *G06F 17/15* (2013.01)

(58) Field of Classification Search
CPC . G06F 16/904; G06F 16/9024; G06F 16/2282
See application file for complete search history.

(56) References Cited

U.S. PATENT DOCUMENTS

| | | | | |
|---|---|---|---|---|
| 9,513,778 | B1* | 12/2016 | Zhang | .................... G06F 3/048 |
| 2002/0078094 | A1* | 6/2002 | Krishnaprasad | ...... G06F 16/284 715/232 |
| 2020/0125559 | A1* | 4/2020 | Talbot | ................. G06F 3/04842 |
| 2020/0394542 | A1* | 12/2020 | Buesser | ................ G06F 16/287 |

* cited by examiner

*Primary Examiner* — Alexander Khong
(74) *Attorney, Agent, or Firm* — Honigman LLP; Brett A. Krueger

(57) ABSTRACT

Embodiments of the present invention provide a method, system and computer program product for visual data object dependency tracing. In an embodiment of the invention, a method for visual data object dependency tracing includes loading into memory of a computer, a data model for data of a database, retrieving a definition for each object in the model and within each retrieved definition, identifying one or more parameters. The method additionally includes correlating a multiplicity of identified ones of the parameters with different objects in the data model and creating a relational table for the correlations. Finally, the method includes generating a visualization of the relational table and displaying the visualization in a display of the computer.

15 Claims, 2 Drawing Sheets

VISUAL DATA MODEL OBJECT DEPENDENCY TRACING

BACKGROUND OF THE INVENTION

Field of the Invention

The present invention relates to the field of data dependency visualization and more particularly to the visualization of object dependencies in a data model.

Description of the Related Art

A data visualization is the graphical representation of data for the purpose of facilitating a visual analysis of the data. By using visual elements like charts, graphs, and maps, data visualization tools provide an accessible way to see and understand trends, outliers, and patterns in data. Data visualizations find application across a bevy of technical disciplines ranging from financial analytics, to epidemiology, to computer network management. Data visualizations also find application in the field of business intelligence and data analytics.

To wit, in the context of big data, data visualization tools and technologies have proven essential in the analysis of massive amounts of information so as to permit managers to make data-driven decisions. At present, with respect to big data and business intelligence, data visualizations have been used to visually link different objects according to core relationships between the objects. A common use includes a nodal graph in which each node refers to an object and each connector between the nodes defines a relationship between the objects of the corresponding nodes.

BRIEF SUMMARY OF THE INVENTION

Embodiments of the present invention address deficiencies of the art in respect to data visualization of object relationships of a data model, and provide a novel and non-obvious method, system and computer program product for visual data object dependency tracing. In an embodiment of the invention, a method for visual data object dependency tracing includes loading into memory of a computer, a data model for data of a database, retrieving a definition for each object in the model and within each retrieved definition, identifying one or more parameters. The method additionally includes correlating a multiplicity of identified ones of the parameters with different objects in the data model and creating a relational table for the correlations. Finally, the method includes generating a visualization of the relational table and displaying the visualization in a display of the computer.

In one aspect of the embodiment, the visualization includes a network of nodes coupled, each coupled to at least one other node by a connector. The nodes each represent a corresponding one of the objects, and each connector represents one of the correlations. Further, each node is configured with program code adapted to respond to a mouse selection of the node by retrieving into memory an associated definition for the corresponding one of the objects for the mouse selected node and to display in the display the associated definition. Optionally, the associated definition is displayed in a markup language format.

In another aspect of the embodiment, the program code is additionally adapted to receive a modification to the associated definition. Consequently, the method further includes identifying one or more parameters of the modified associated definition, in complement to other parameters identified for other definitions of other objects in the data model prior to the modification of the associated definition, and re-correlating a multiplicity of the identified ones of the parameters with the different objects in the data model. Thereafter, a new relational table is created for the re-correlations, a new visualization generated for the new relational table and the new visualization displayed in the display of the computer along with a previous visualization from prior to the modification of the associated definition. Optionally, a directive is included in the modified associated definition to modify a visual characteristic of a corresponding node in the new visualization.

In another embodiment of the invention, a data processing system is configured for visual data object dependency tracing. The system includes a host computing system having one or more computers, each with memory and at least one processor. The system also includes a display coupled to the host computing system, a fixed storage device storing thereon a database of data and a data model disposed in the memory of the host computing system and modeling the data of the database. Finally, the system includes a visual data object dependency tracing module that includes computer program instructions. The computer program instructions, during execution in the memory of the host computing system, load the data model into the memory, retrieve into the memory a definition for each object in the model and within each retrieved definition, identifies one or more parameters. The computer program instructions further correlate in the memory a multiplicity of identified ones of the parameters with different objects in the data model and create in the memory a relational table for the correlations. Finally, the computer program instructions generate in the memory a visualization of the relational table and display the visualization in the display.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for visual data object dependency tracing in a data model. A data model for a database includes different objects, each with a definition, each definition including one or more parameters. In accordance with an embodiment of the invention, a data model is loaded into memory of a computer. For each of the objects in the data model, a corresponding one of the definitions may be retrieved and, within each retrieved definition, one or more of the parameters identified. Then, multiple identified ones of the parameters are correlated with different ones of the objects in the data model so that a relational table may be created for the correlations. Thereafter, a visualization is generated using the relational table and the visualization is then displayed in a display of the computer. In this way, the different dependencies of the objects of the data model may be visualized. As well, an effect upon the dependencies resulting from proposed changes in individual ones of the parameters of a definition for a corresponding one of the objects may be visualized in the display as the visualization changes in consequence of the proposed changes prior to commitment of the changes to the data model.

Figure 1:
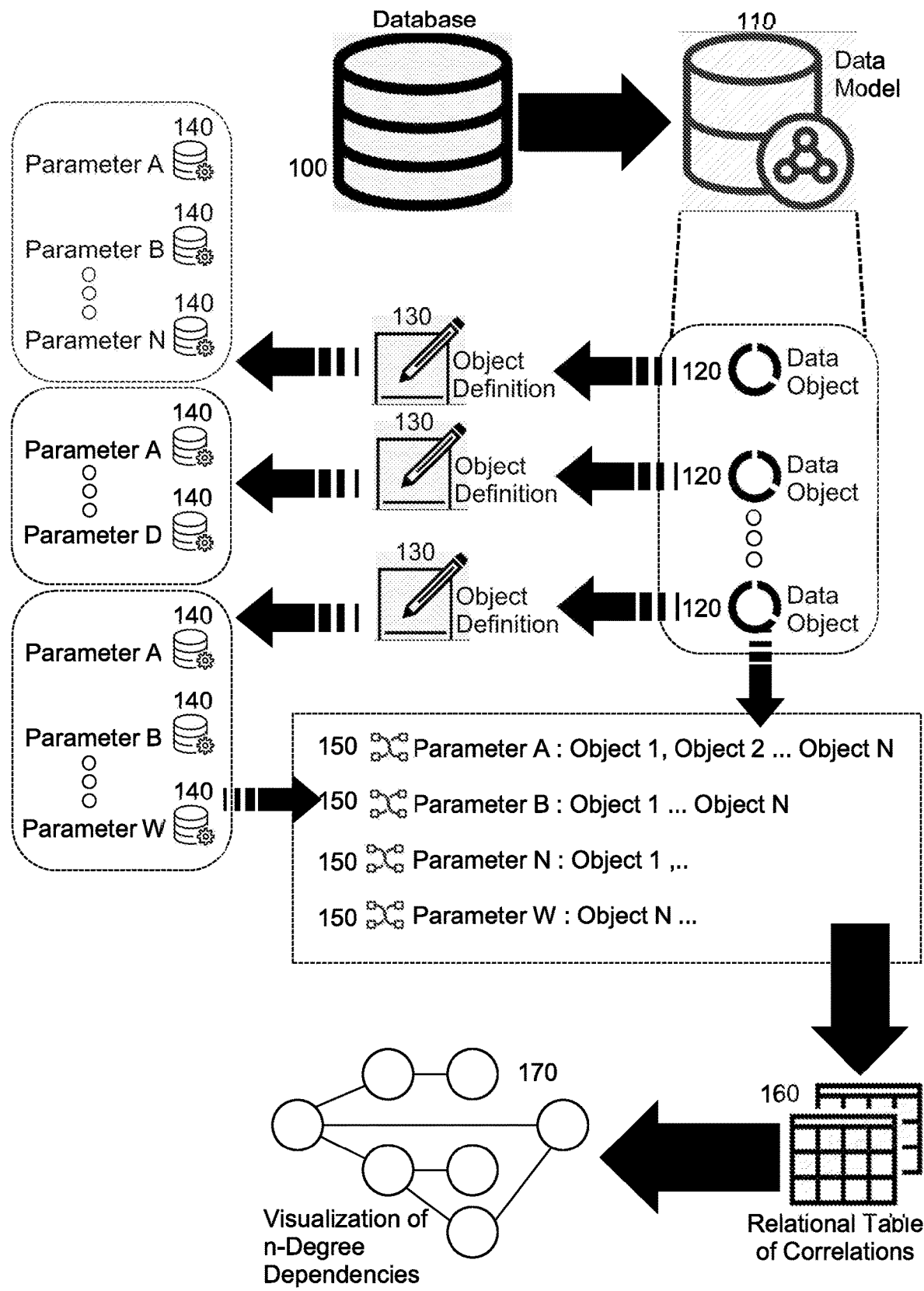
FIG. 1 is pictorial illustration of a process for visual data object dependency tracing.

In further illustration, FIG. 1 pictorially shows a process for visual data object dependency tracing. As shown in FIG. 1, a data model 110 is generated for a database 100 by accessing an interface to the database 100 in order to identify the different tables, views, primary keys, foreign keys, indexes, triggers and check clauses of the database and store a representation of the same in a logical model. Each of the foregoing is represented as different data object 120 and each data object 120 includes a corresponding object definition 130 specifying the detailed information describing a corresponding one of the objects 120. Each definition 130, in turn, includes one or more parameters 140. As such, each of the parameters 140 across all of the object definitions 130 may be expressed as a correlation 150 with one or more of the objects 120 and stored in a relational table of correlations 160.

Utilizing the relational table 160, then, a visualization 170 may be created as a hierarchy of interconnected nodes. In this regard, the hierarchy of interconnected nodes shows a selected one of the objects 120 as a root one of the nodes of the visualization 170, connected to first, second and n-degree dependences of others of the objects 120 expressed on directly and indirectly coupled ones of the nodes of the visualization 170. Directly coupled ones of the nodes to the root node reflect first degree dependent ones of the objects 120 of the selected one of the objects. As well, indirectly coupled ones of the nodes reflect second and n-degree dependent ones of the objects 120, as the case may be. Importantly, each of the nodes in the visualization may be configured for selection in the display such that a selection of one of the nodes results in the display of a window presenting the parameter or parameters 140 for an underlying object definition 130 of a corresponding one of the objects 120.

Figure 2:
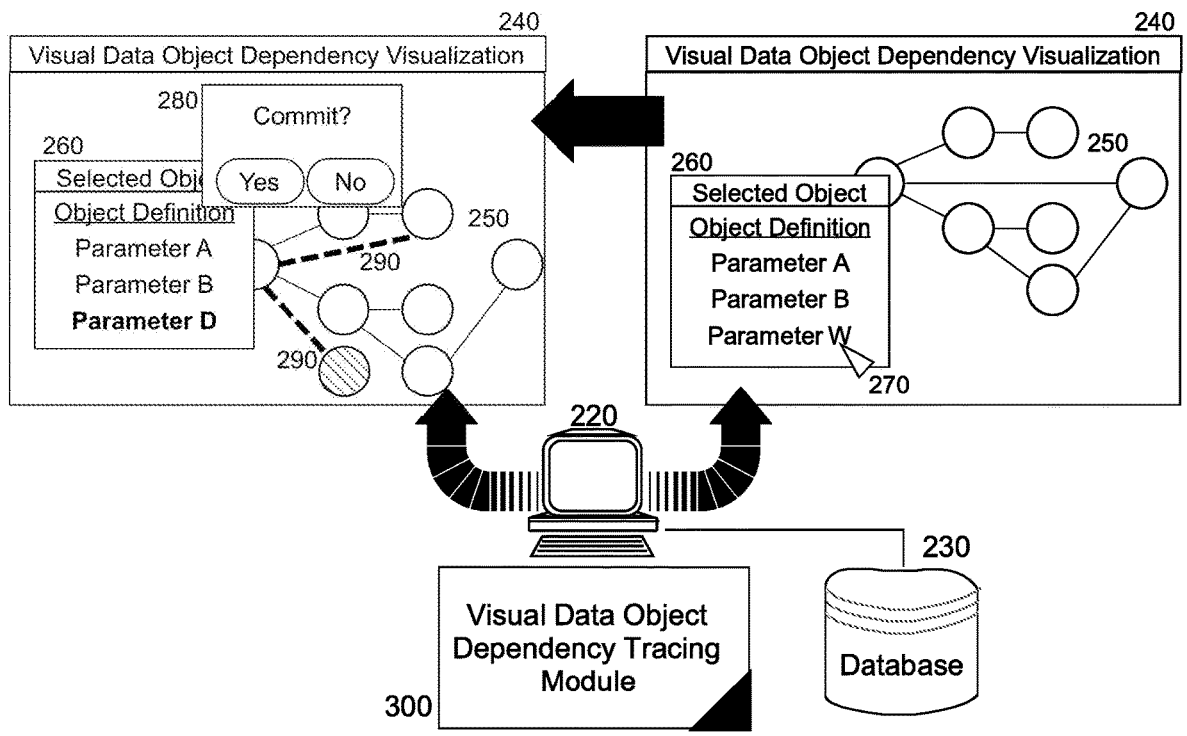
FIG. 2 is a schematic illustration of a data processing system configured for visual data object dependency tracing; and, FIG. 3 is a flow chart illustrating a process for visual data object dependency tracing.

The process described in connection with FIG. 1 may be implemented in a computer data processing system. In further illustration, FIG. 2 schematically shows a data processing system configured for visual data object dependency tracing. The system includes a host computing system 220 that includes at least one computer with memory and at least one processor. A database 230 is coupled to the host computing system 220 and is accessible through a programming interface such as a relational database management system. Of note, the system include a visual data object dependency tracing module 300.

The visual data object dependency tracing module 300 includes computer program instructions that when executing in the memory of the host computing system 220, is enabled to access a data model generated from the database 230 and to identify for each of the objects of the model, a corresponding definition, and for each of the definitions, one or more parameters. The program instructions further are enabled to correlate each of the parameters to one or more of the objects and to store the same in a relational database table. Finally, the program instructions are enabled to generate in a user interface 240, a visualization 250 of a selected one of the objects in the data model and dependent other objects based upon the correlations to the extent that objects in the data model sharing the same parameters are dependent upon one another directly, and objects in the data model determined to be directly dependent upon a same other one of the objects, but not upon each other, are indirectly dependent upon one another. In this regard, the visualization 250 includes a hierarchy of nodes expressed as a root node for the selected one of the objects, and directly coupled nodes to the root node reflecting direct dependencies, and indirectly coupled nodes by way of an intermediate node or nodes to the root node reflecting indirect dependencies.

Notably, each of the nodes in the visualization 250, once displayed in the user interface 240, are activatable such that the selection of one of the nodes by mouse pointer 270 triggers the presentation of a window 260 including the different parameters of a definition of an object of the data model corresponding to the selected one of the nodes in the visualization 250. Optionally, individual ones of the parameters may be expressed in a structured markup form as incorporated in the data model of the database 230. Importantly, selected ones of the parameters in the window 260 are editable such that a direct edit to the definition may be applied within the window 260, including modifying a markup language representation of a corresponding one of the parameters in the data model.

Consequently, once an edit to a parameter in the window 260 has been applied, the program instructions can recompute the correlations between the parameters and the objects in the relational table. As well, the program instructions can re-generate a new version of the visualization 250 and the new version of the visualization 250 is presented in the display 240. But, the new version of the visualization 250 is presented along with suitable decorators 290 applied to the nodes and nodal connectors that have changed in view of the proposed modification to the underlying parameter. In this way, the end user may visualize the impact of the dependencies of the objects of the data model to one another based upon the proposed change to the underlying parameter. A commit window 280 then is displayed in the display 240 and, the edit to the definition is committed only upon receiving a user interface interaction in the commit window 280 indicating an intent to commit the proposed change to the parameter.

Figure 3:
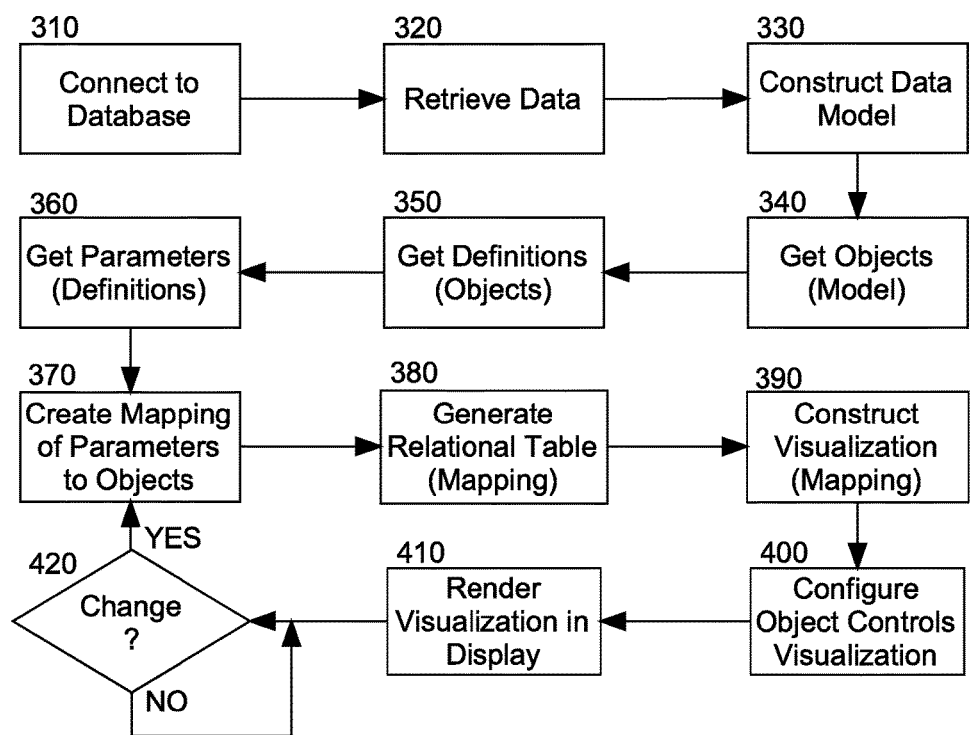

In even further illustration of the operation of the visual data object dependency tracing module, FIG. 3 is a flow chart illustrating a process for visual data object dependency tracing. Beginning in block 310, a connection is established with a database from over a computer communications network and, in block 320, data in the database is retrieved for analysis in order to construct a data model in block 330. In block 340, the different objects of the database model are retrieved and in block 350, a definition is retrieved for each of the objects. Then, in block 360, one or more parameters are retrieved for each of the definitions. Thereafter, in block 370 a mapping is created that maps each of the parameters to a set of one or more of the objects with corresponding definitions that include the same parameter.

Finally, in block 380 the mapping is used to generate a relational table of the correlations and in block 390 a visualization is created as a hierarchy of nodes based upon the mapping. The hierarchy includes a selected object as a root node, and directly dependent ones of the objects sharing a same parameter with that of the selected object as other nodes directly linked to the root node, and other nodes directly linked to nodes linked to the root node for objects only indirectly dependent upon the selected object of the root node. In block 400, each node is configured to respond to a selection by displaying a window including the parameters of the definition for the underlying object, such as by way of a Web request to a Web server with a specific query to the data model seeking a return of the parameters to be displayed in a small browser window. Finally, in block 410, the visualization is displayed in a display such as a browser window so that an end user can directly interact with the nodes of the hierarchy.

In decision block 420, a change may be detected in the definition of an underlying one of the objects. In that event, in block 370, the process repeats with the creation of a new mapping of parameters to objects and the generation of a new relational table in block 380. Finally, a new visualization is constructed based upon the new mapping of the relational table in block 390 and in block 400, the nodes of the hierarchy of the visualization are configured for end user interaction and in block 410, the new visualization is displayed in the display.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are pos- sible without departing from the scope of the invention defined in the appended claims as follows:

I claim:

1. A method for visual data object dependency tracing comprising:
   loading into memory of a computer, a data model for data of a database;
   retrieving a definition for each object in the data model and within each retrieved definition, identifying one or more parameters;
   correlating a multiplicity of identified ones of the parameters with different objects in the data model;
   creating a relational table for the correlations;
   generating a visualization of the relational table;
   displaying the visualization in a display of the computer, the visualization comprising a network of nodes coupled, each node coupled to at least one other node by a connector and each node representing a corresponding one of the objects, each connector representing one of the correlations, wherein each node is configured with program code adapted to:
      respond to a mouse selection of the node by retrieving into memory an associated definition for the corresponding one of the objects for the mouse selected node; and
      display, in the display, the associated definition in a markup language format;
   receiving a modification to the associated definition;
   identifying one or more parameters of the modified associated definition, in complement to other parameters identified for other definitions of other objects in the data model prior to the modification of the associated definition;
   re-correlating a multiplicity of the identified ones of the parameters with the different objects in the data model;
   creating a new relational table for the re-correlations;
   generating a new visualization of the new relational table; and
   displaying the new visualization in the display of the computer along with a previous visualization prior to the modification to the associated definition.

2. The method of claim 1, further comprising including in the modified associated definition, a directive to modify a visual characteristic of a corresponding node in the new visualization.

3. A data processing system configured for visual data object dependency tracing, the system comprising:
   a host computing system comprising one or more computers, each with memory and at least one processor;
   a display coupled to the host computing system;
   a fixed storage device storing thereon a database of data;
   a data model disposed in the memory of the host computing system and modeling the data of the database; and,
   a visual data object dependency tracing module comprising computer program instructions which, during execution in the memory of the host computing system, performs:
      loading the data model into the memory;
      retrieving into the memory a definition for each object in the data model and within each retrieved definition, identifying one or more parameters;
      correlating in the memory a multiplicity of identified ones of the parameters with different objects in the data model;
      creating in the memory a relational table for the correlations;
      generating in the memory a visualization of the relational table; and,
      displaying the visualization in the display, the visualization comprising a network of nodes coupled, each node coupled to at least one other node by a connector and each node representing a corresponding one of the objects, each connector representing one of the correlations, wherein each node is configured with program code adapted to:
         respond to a mouse selection of the node by retrieving into memory an associated definition for the corresponding one of the objects for the mouse selected node; and
         display, in the display, the associated definition in a markup language format;
      receiving a modification to the associated definition;
      identifying one or more parameters of the modified associated definition, in complement to other parameters identified for other definitions of other objects in the data model prior to the modification of the associated definition;
      re-correlating a multiplicity of the identified ones of the parameters with the different objects in the data model;
      creating a new relational table for the re-correlations;
      generating a new visualization of the new relational table; and
      displaying the new visualization in the display of the computer along with a previous visualization prior to the modification to the associated definition.

4. The system of claim 3, wherein the program instructions further perform including in the modified associated definition, a directive to modify a visual characteristic of a corresponding node in the new visualization.

5. A computer program product for visual data object dependency tracing, the computer program product including a non-transitory computer readable storage medium having program instructions embodied therewith, the program instructions executable by a device to cause the device to perform a method including:
   loading into memory of a computer, a data model for data of a database;
   retrieving a definition for each object in the data model and within each retrieved definition, identifying one or more parameters;
   correlating a multiplicity of identified ones of the parameters with different objects in the data model;
   creating a relational table for the correlations;
   generating a visualization of the relational table; and,
   displaying the visualization in a display of the computer, the visualization comprising a network of nodes coupled, each node coupled to at least one other node by a connector and each node representing a corresponding one of the objects, each connector representing one of the correlations, wherein each node is configured with program code adapted to:
      respond to a mouse selection of the node by retrieving into memory an associated definition for the corresponding one of the objects for the mouse selected node; and
      display, in the display, the associated definition in a markup language format;
   receiving a modification to the associated definition;
   identifying one or more parameters of the modified associated definition, in complement to other parameters identified for other definitions of other objects in the data model prior to the modification of the associated definition;

re-correlating a multiplicity of the identified ones of the parameters with the different objects in the data model;

creating a new relational table for the re-correlations;

generating a new visualization of the new relational table; and, displaying the new visualization in the display of the computer along with a previous visualization, prior to the modification to the associated definition.

6. The computer program product of claim 5, wherein the method further comprises including in the modified associated definition, a directive to modify a visual characteristic of a corresponding node in the new visualization.

7. The method of claim 1, wherein the modification comprises a change to one or more of the identified parameters of the associated definition.

8. The method of claim 1, wherein each correlation represents a direct dependency between the coupled nodes.

9. The method of claim 1, further comprising, after displaying the new visualization, receiving an indication to commit the modification.

10. The system of claim 3, wherein the modification comprises a change to one or more of the identified parameters of the associated definition.

11. The system of claim 3, wherein each correlation represents a direct dependency between the coupled nodes.

12. The system of claim 3, wherein the program instructions further perform, after displaying the new visualization, receiving an indication to commit the modification.

13. The computer program product of claim 5, wherein the modification comprises a change to one or more of the identified parameters of the associated definition.

14. The computer program product of claim 5, wherein each correlation represents a direct dependency between the coupled nodes.

15. The computer program product of claim 5, further comprising, after displaying the new visualization, receiving an indication to commit the modification.

\* \* \* \* \*